EXTRACTION OF HYDRAZINE FROM AQUEOUS SOLUTION USING A FLUORINATED ALCOHOL

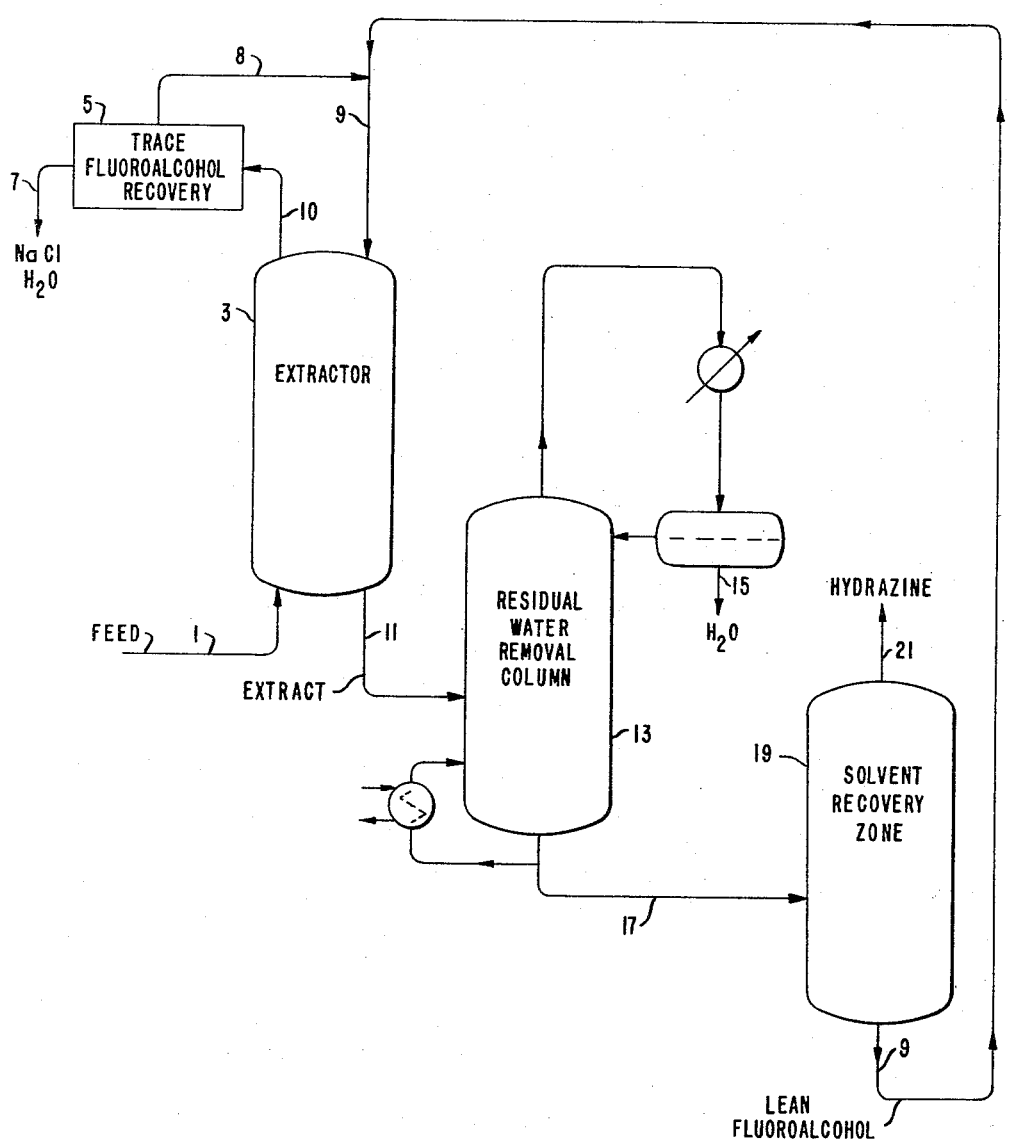

Arthur K. Dunlop, Berkeley, Calif., assignor to Shell Oil Company, New York, N.Y., a corporation of Delaware
Filed Aug. 23, 1963, Ser. No. 304,060
4 Claims. (Cl. 23—312)

This invention relates to a process for recovery of hydrazine and more particularly to a method for extracting hydrazine from aqueous solutions.

Because of its remarkable oxidizability as a fuel, hydrazine and means for its production have been and are currently the subject of extensive research. However, the high cost of manufacture of hydrazine has seriously limited the commercial and technical development of application of the compound.

One of the chief reasons for the expense involved in producing concentrated or anhydrous hydrazine is the difficulty of concentrating the dilute aqueous solutions obtained in the Raschig synthesis (which is the only preparative method that is believed to have been developed into a commercial procedure to date) involving oxidation of ammonia or an ammonia derivative by hypochlorite. The major steps in the Raschig synthesis are set forth below:

$$2NaOH + Cl_2 \longrightarrow NaOCl + NaCl + H_2O \quad (1)$$

$$NaOCl + NH_3 \xrightarrow[\text{fast}]{\sim 0^\circ C.} NH_2Cl + NaOH \quad (2)$$

$$NH_2Cl + NH_3 + NaOH \xrightarrow[\text{slow}]{} N_2H_4 + NaCl + H_2O \quad (3)$$

Sodium hypochlorite is reacted with ammonia to give chloroamine in a fairly rapid reaction. A large excess of ammonia is then used to give reaction (3) preference to side reaction, (4) below:

$$2NH_2Cl + N_2H_4 \rightarrow 2NH_4Cl + N_2 \quad (4)$$

Use of materials such as glue and gelatin which inactivate metallic ions which strongly catalyze (4), also increases the hydrazine yield.

The approximate composition of the Raschig synthesis liquor produced as described is shown in Table I below:

TABLE I.—APPROXIMATE COMPOSITION OF RASCHIG SYNTHESIS LIQUOR

| Compound | Original Liquid (after NH₃ flashed off) | | | After Water Removal to Salt Saturation Point | | |
|---|---|---|---|---|---|---|
| | Moles | Concentration | | Moles | Concentration | |
| | | Moles per Liter | Percent by Weight | | Moles per Liter | Percent by Weight |
| Water | 100 | (¹) | 88.75 | 30 | (¹) | 70.4 |
| NaCl | 3.3 | 1.7 | 9.5 | 3.3 | 5.1 | 25.1 |
| N₂H₄ | 1.1 | 0.6 | 1.74 | 1.1 | 1.7 | 4.6 |
| NH₃ | ² (38) | | | 0 | 0 | 0 |

¹ Remainder.
² Ammonia present before flashing.

As can be seen, the Raschig synthesis unfortunately yields a crude liquor containing less than about 2 percent hydrazine and the product must, therefore, be concentrated.

Many ways have been investigated to determine suitable means for recovery of the hydrazine; but most, if not all, have one or more disadvantages which either prohibit their use and/or materially increase the cost of the concentrated product. The two most usual means for this separation have involved (1) physical separations, such as distillation, freezing, liquid-liquid extraction, caustic dehydration, etc.; and (2) chemical separation based on precipitation or insolubility of a derivative of hydrazine.

Liquid-liquid extraction offers the most promising way to obtain sufficient separation. This means the great bulk of the water and essentially all of the salt are rejected in the primary extraction step. Thus, contrary to most commercial distillation processes, most of the feed stream is never distilled at all and, in addition, a considerable reduction in the size of the remaining distillation columns results.

One of the factors militating against the use of liquid-liquid extraction to achieve the desired separation is the inability to find water-immiscible organic solvents which are non-reactive with hydrazine and which can be used to extract hydrazine from the dilute aqueous solution. It is known in the art, however, that it is possible to use certain water-immiscible aldehydes and ketones directly as extractive solvents; however these substances also function as reagents to convert hydrazine into corresponding azines and ketazines and this is in many cases undesirable, since strong aqueous acidic solutions are required to hydrolyze the compounds in order to recover the extract.

Another known method involves the liquid-liquid extraction of the hydrazine by means of an organic acid solvent such as hydroxybenzene and certain of its alkyl homologs. Such a method is set forth in U.S. Patent 2,780,531 issued Feb. 5, 1957, to R. N. Lewis. While the alpha value, i.e., the selectivity (on salt-free basis) as represented by the relationship, $$\alpha = \frac{\dfrac{\text{mol fraction hydrazine}}{\text{mol fraction H}_2\text{O}} \text{ (in extract)}}{\dfrac{\text{mol fraction hydrazine}}{\text{mol fraction H}_2\text{O}} \text{ (in raffinate)}}$$

which is obtained for such a separation is quite favorable, an improved selectivity would be desirable. Moreover, a substantial portion of the cost of recovering hydrazine by this means is involved in the utilities cost for separating the solvent from the raffinate.

Thus, while the methods of concentration described above have generally served the purpose, they have not proved entirely satisfactory for the reasons stated, and also since many of those processes require substantial fractional distillation facilities, which in turn require a high heat consumption to vaporize the water. Moreover, many times only large and intricately designed fractionating columns equipped with vacuum apparatus can be employed. Because of azeotrope formation between water and hydrazine, maximum concentration of hydrazine from ordinary distillation is limited. Furthermore, many of the chemical means of separation require costly raw materials and expensive equipment and frequently involve production of by-products which of themselves are difficult to separate from hydrazine.

In accordance with the instant invention, it has been discovered that it is possible to separate hydrazine from an aqueous solution, such as a dilute, flashed, i.e., ammonia-free, Raschig synthesis liquor, by liquid-liquid extraction merely by contacting the solution containing hydrazine with a solvent comprising a fluoroalcohol, forming solvent phase comprising hydrazine and solvent and a raffinate phase comprising water, and salt, and recovering the hydrazine from the solvent phase. In this manner, unexpectedly, the above-noted problems are minimized or substantially overcome, and a more economical and efficient recovery of hydrazine is achieved.

The term "fluoroalcohol" which is used to define the extractant suitable for the present process may be described as a fluorinated alcohol having at least five carbon atoms which carbon atoms are substituted by at least five fluorine atoms and no more than twenty-one carbon atoms, and which is also capable of the following molecular configuration:

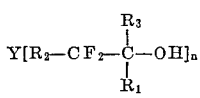

wherein, for $n=1$, $Y=Z$ (as defined hereinafter); for $n=2$, Y is selected from the group consisting of O, $R_4$, and $OR_4O$; for $n=3$, Y is selected from the group consisting of N, and CZ; for $n=4$, $Y=C$; and where $R_1$ and $R_3$ are selected from the group consisting of a saturated, hydrocarbon radical of the general formula $$C_mZ_{2m+1}$$

and a cyclic, saturated, hydrocarbon radical of the general formula:

$$C_mX_{2m-1}$$

and where $R_2$ and $R_4$ are selected from the group consisting of a saturated hydrocarbon diradical of the general formula:

$$C_dZ_{2d}$$

and a cycylic, saturated hydrocarbon diradical of the general formula:

$$C_dZ_{2d-2}$$

and where Z is selected from the group consisting of H, F, and Cl but must$=H$ in those groups wherein $m=$(zero); and where $m$ and $d$ are integers from 0–10; and where at least 60% of $Z=X$ where X is a halogen selected from the group consisting of F and Cl; and where at least 67% of $X=F$; and where the ratio of $C/OH$ ranges from 5:1 to 11:1; and where the total number of carbons ranges from 5 to 21.

These compounds may be prepared in various manners known in the art. See for example the book, "Aliphatic Fluorine Compounds," by A. M. Lovelace, D. A. Rausch and W. Postelnek, Reinhold Pub. Corp., N.Y., (1958) particularly pages 403, 502, and 706. For example, in preparing the ether compounds, the traditional Williamson-type synthesis route may be employed. In producing the amine derivatives, direct synthesis by means of an electrolytic cell such as a Simon cell may be utilized using conditions easily ascertainable by those skilled in the art.

Specific examples of some of the suitable compounds are: $H(CF_2)_4CH_2OH$ (1H, 1H, 5H-octafluoro-1-pentanol), $H(CF_2)_6CH_2OH$ (1H, 1H, 7H-dodecafluoro-1-heptanol), $H(CF_2)_8CH_2OH$ (1H, 1H, 9H-hexadecafluoro-1-nonanol), $H(CF_2)_{10}CH_2OH$ (1H, 1H, 11H-eicosafluoro-1-undecanol), etc. The most preferred member of this group is the $C_7$ fluoroalcohol.

Other suitable compounds may be represented by the following general formula:

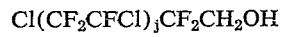

wherein $j$ represents a small whole number of from 1 to 5. Specific examples of these compounds are

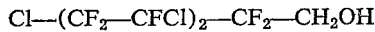

and $Cl-(CF_2-CFCl)_3-CF_2-CH_2OH$. These compounds are known in the art and may be prepared in various ways including the reduction of the corresponding acid chloride with lithium aluminum hydride.

Many of the fluoroalcohols may also be prepared as set forth in U.S. Patent 2,559,628 issued July 10, 1951, to R. M. Joyce, Jr. Other particularly preferred compounds are $HOCH_2(CF_2)_6-O-(CF_2)_6CH_2OH$, and

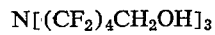

The most preferred compounds are generally those wherein the ratio in the molecule of $-CH_2OH$ groups to total number of carbon atoms is from about 1 to 5 to about 1 to 7 because this insures immiscibility with water and gives a high extraction efficiency for hydrazine.

The higher alcohols generally tend to be less efficient in the extraction step since extraction is not as effective at the higher temperatures necessitated by their higher melting points and also their higher molecular volumes tend to decrease their solvency. The miscibility of fluoroalcohol and aqueous phases decreases with decreasing temperature. Moreover, the volumetric efficiency of the fluoroalcohol extractants increases with decreasing molecular weight. This effect is due to the smaller molecular volume of the lower alcohols. The distribution constants, however (based on concentrations expressed as mol fractions) differ little from one fluoroalcohol to the next. Thus, the most ideal fluoroalcohol for hydrazine extraction is liquid at ambient temperature, and has a relatively low molecular weight for efficient extraction and yet is relatively high boiling to preclude the formation of a hydrazine-fluoroalcohol azeotrope.

The more exact nature of this invention as well as the objectives and advantages thereof will be readily apparent from a consideration of the discussion relating to the annexed drawing which consist of a single figure, and which illustrates one embodiment of a typical fluoroalcohol extraction process for the recovery of hydrazine from a dilute Raschig synthesis feed.

As shown in the figure, hydrazine is extracted by a fluoroacohol from the flashed feed in a countercurrent contactor. The residual water is next distilled off to give an anhydrous fluoroalcoholhydrazine solution. The means employed in the solvent recovery zone will be readily apparent to those of ordinary skill in the art. For example, straight distillation precipitive techniques, azeotropic and extractive distillations, etc., may be utilized.

Obviously, the number of extraction stages employed improve the effectiveness of the separation. While a rotating disc-contactor such as disclosed in the Reman et al. patent, U.S. 2,601,674, issued June 24, 1952, is particularly preferred, it is obvious that other conventional liquid-liquid contacting devices may be employed. For example, spare towers, back towers, baffle towers, perforated towers, such as are well known in the art may be utilized.

While a continuous extraction process is preferred it is also apparent that batch extraction techniques are suitable; and while a countercurrent contacting scheme is illustrated in the figure, it is, of course, suitable to use co-current contacting. Upon the separation of hydrazine from the fluoroalcohol, the recovered lean solvent may be routed to the extraction column to be utilized again.

The volume of solvent required to extract the hydrazine from the aqueous solution is, of course, largely dependent upon the solubility of the hydrazine in the particular solvent selected from the class of solvents suitable for the purpose and concentration of the hydrazine in the particular solution from which it is to be separated. Generally, however, the volume ratio of solvent to feed should be within the range of from .5 to 1 to 10 to 1, a more preferred range being from about 1 to 1 to 6 to 1 and the most preferred being from 1 to 1 to 3 to 1.

The extraction may be made at room temperature or any other convenient temperature bearing in mind the above-recited relationship between the extraction properties of the fluoroalcohol and the temperature. However, the temperature of extraction may range from the freezing point of the aqueous solution of hydrazine up to its boiling point assuming the selection of a liquid solvent of the particular temperature of operation selected. While the preferred operating pressure is atmospheric, this process variable may obviously be modified also.

More specifically referring to the figure, after flashing ammonia therefrom (not shown) the Raschig synthesis liquid (described previously) is fed into the extractor 3 through line 1. In the extractor which may be a rotating disc contactor or any similar liquid-liquid contacting device the feed is countercurrently contacted with lean fluoroalcohol solvent introduced into the extractor by means of line 9. Overhead through line 10 is passed the constituents of the spent liquid including trace amounts of fluoroalcohol, solvent. The salt and water are withdrawn from the trace fluoroalcohol recovery zone (steam stripper, stripping with inert gas, etc.) 5 through line 7. The fluoroalcohol recovered in this zone is sent back by means of line 8 to the lean fluoroalcohol line 9.

The extract recovered from the extractor comprising zone, i.e., column 13 and then effect a separation in the manner previously described.

The fluoroalcohols employed in the process of the instant invention give unexpectedly outstanding results compared to many other physical solvents. As can be seen from the following table, fluoroalcohol is 10 times as effective as acidic extractants such as 2-ethylhexoic acid and nearly 5 times as effective as di-2-ethylhexyl phosphoric acid:

TABLE II.—EXTRACTION OF HYDRAZINE FROM SIMULATED (FLASHED) RASCHIG SYNTHESIS LIQUID

| Solvent: | Relative volumetric distribution ratio, $\frac{\text{conc. } N_2H_4 \text{ in solvent}}{\text{conc. } N_2H_4 \text{ in aqueous phase}}$ |
|---|---|
| Benzene | 0.000 |
| Chloroform | 0.002 |
| 2-ethylhexanol | 0.0085 |
| Cyclohexanol | 0.027 |
| 2-ethylhexoic acid | 0.095 |
| Di-2-ethylhexyl phosphoric acid | 0.21 |
| $C_5$ fluoroalcohol, $H(CF_2)_4CH_2OH$ | [1] 1.00 |

[1] Absolute value here is 0.89 with 2:1 solvent to feed ratio and synthetic feed concentration of 1.75 moles hydrazine per liter and 5 moles of sodium chloride per liter.

Moreover, when fluoroalcohols are compared with m-cresol the alpha value between hydrazine and water is considerably better for the fluoroalcohols as can be seen from Table III. The outstanding feature of the fluoroalcohol, however, is its much lower solubility in the raffinate, and this with its higher vapor pressure makes recovery of solvent from the raffinate much easier.

TABLE III.—EXTRACTION OF HYDRAZINE BY m-CRESOL AND TWO FLUOROALCOHOLS [a]

| Feed Concentrations | | Solvent | | | | | | | |
|---|---|---|---|---|---|---|---|---|---|
| $N_2H_4$, Moles/l. | NaCl, percent w. | m-Cresol | | $C_7FA$ [d] | | Concentration, percent w. | | | |
| | | $K_{N_2H_4}$ [b] | $\alpha$ [c] | $K_{N_2H_4}$ [b] | $\alpha$ [c] | $H_2O$ in Extract | m-Cresol in Raffinate | $H_2O$ in Extract | $C_7FA$ in Raffinate |
| 1.7 | 0 | 3.2 | 6.7 | 3.1 | 10.6 | 13.3 | 3.0 | 2.4 | 0.15 |
| 0.6 | 0 | 5.1 | 11.1 | 4.8 | 15.1 | 12.5 | 2.6 | 2.5 | 0.12 |
| 0.6 | 9.5 | 5.9 | 14.4 | 4.9 | 16.9 | 11.6 | 1.0 | 2.3 | 0.07 |
| 0.6 | 22.7 | 7.1 | 21.1 | 5.6 | 25.7 | 8.0 | 0.3 | 1.5 | 0.03 |
| | | | | $FC_8FA$ [e] at 40° C. | | | | $FC_8FA$ at 40° C. | |
| 0.9 | 9.5 | | | 3.4 | 15.0 | | | 1.0 | 0.19 |

[a] Temperature is ca. 22° C. unless otherwise specified.
[b] $K_{N_2H_4} = \frac{X_{N_2H_4} \text{ (solvent phase)}}{X_{N_2H_4} \text{ (Aqueous phase; salt-free basis)}}$, where $X_{N_2H_4}$ is the mole fraction of hydrazine.
[c] $\alpha = K_{N_2H_4}/K_{H_2O}$.
[d] $H(CF_2)_6CH_2OH$.
[e] $F(CF_2)_7CH_2OH$.

fluoroalcohol and hydrazine and small amounts of water is passed by means of line 11 to a residual water removal column 13 (distillation or flasher) wherein residual water carried by the extract is rejected through line 15. The remaining extract is then sent through line 17 to the solvent recovery zone 19 (distillation column, azeotropic distillation column, etc.) wherein hydrazine product is recovered through line 21 and solvent are separated prior to the recycle of the latter to the extraction zone through line 9.

While dilute Raschig synthesis liquid has heretofore been referred to as the feed, it is, of course, possible to operate with much more concentrated starting materials, i.e., wherein the hydrazine is present in amounts as high as 60 to 70% or even higher. In other words, the process of the present invention may be used in conjunction with other known methods of separation or concentrating hydrazine to prepare substantially anhydrous hydrazine. If the latter is the case, i.e., the starting material has a high (e.g., up to 60–70% or higher) concentration then it is necessary only to mix the feed with the fluoroalcohol and send the mixture directly to the residual water removal As illustrative of the instant process are the following examples:

*Example I*

Twenty-five parts by volume of feed containing 9.5% by weight of sodium chloride and 0.58 mole of hydrazine per liter of solution were contacted with 15 parts by volume of $C_7$ fluoroalcohol, $H(CF_2)_6CH_2OH$, at room temperature, shaken and the phases separated. The aqueous raffinate phase contained 0.7% mole (salt-free basis) or 0.40 mole/liter of hydrazine and only 0.07% w. $C_7$ fluoroalcohol. The $C_7$ fluoroalcohol extract phase contained 3.6% mole (0.27 mole/liter) of hydrazine and only 2.3% w. water. In a similar test using meta-cresol for the extractant, the aqueous raffinate phase contained 0.5% mole (salt-free basis) or 0.30 mole/liter of hydrazine and 1% w. meta-cresol; the meta-cresol extract phase contained 3.2% mole or 0.48 mole/liter of hydrazine and a large amount of water, 11.6% w.

*Example II*

One liter of feed containing 9.5% w. sodium chloride and 0.6 mole of hydrazine is contacted with one liter of $C_7$ fluoroalcohol, $H(CF_2)_6CH_2OH$, at room temperature, shaken thoroughly, the phases are allowed to segregate and then are separated by decanting. The fluoroalcohol extract phase contains about 0.25 mole of hydrazine, somewhat over 40% of that in the original feed; water in the extract is about 2.2 moles giving an extract wherein the weight ratio of water/hydrazine is about 5.1 whereas in the feed, the ratio was 50. The aqueous raffinate contains the remaining 0.35 mole of hydrazine. Contacting the aqueous raffinate from this first extraction with a liter of fresh $C_7$ fluoroalcohol in a similar manner gives, upon final separation, a second extract containing 0.15 mole of hydrazine and a raffinate containing 0.20 mole of hydrazine.

This operation of extracting the raffinate with successive equal volumes of fresh $C_7$ fluoroalcohol is continued until 5 extractions have been made; the results are given in the table below.

TABLE IV

| Extraction Stage | Hydrazine Conc. Moles/l. | | | Cumulative Combined Extracts | |
|---|---|---|---|---|---|
| | Feed | Raffinate | Extract | Percent Recovery of Hydrazine | Wt. Ratio $H_2O/N_2H_4$ |
| 1 | .60 | .35 | .25 | 41 | 5 |
| 2 | .35 | .20 | .15 | 67 | 6 |
| 3 | .20 | .11 | .09 | 82 | 8 |
| 4 | .11 | .06 | .05 | 90 | 9 |
| 5 | .06 | .033 | .028 | 95 | 11 |
| Feed | .60 | | | | 50 |

Thus in 5 stages, 95% of the hydrazine is recovered and about 80% of the water is still rejected. Of course, in countercurrent operation even a much better separation is obtainable; in the limit, with this same feed, an extract would be obtained which contained 0.37 mol./l. of hydrazine and the water to hydrazine ratio would be only 3.4 on a weight basis, representing a 93% rejection of water.

I claim as my invention:
1. An extraction process for separating hydrazine from aqueous solutions thereof which comprises:
    (a) mixing a water immiscible $C_{5-21}$ fluoroalcohol containing at least five substituted fluorine atoms with the aqueous hydrazine feed solution,
    (b) allowing the mixture to settle and decanting off a hydrazine-fluoroalcohol layer and
    (c) distilling the hydrazine-fluoroalcohol layer to separate and recover the hydrazine as a product.
2. A continuous countercurrent extraction process for the recovery of hydrazine which comprises:
    (a) contacting a flashed dilute aqueous feed solution of hydrazine prepared by Raschig synthesis with a water immiscible $C_{5-21}$ fluoroalcohol containing at least five substituted fluorine atoms in an extraction zone,
    (b) separating and removing a hydrazine-fluoroalcohol extract phase,
    (c) separating and removing a raffinate phase comprising water and salt components of said feed solution,
    (d) removing trace fluoroalcohol from the raffinate phase and recycling said fluoroalcohol to the extraction zone,
    (e) passing the hydrazine-fluoroalcohol extract phase to and removing residual water from said extract in a residual water removal zone,
    (f) removing a substantially anhydrous hydrazine and fluoroalcohol mixture from said water removal zone, and
    (g) passing said hydrazine and fluoroalcohol mixture to a distillation zone wherein anhydrous hydrazine is recovered as product and lean fluoroalcohol is recycled to said extraction zone.
3. The process of claim 2 wherein the fluoroalcohol employed is $C_7$ fluoroalcohol.
4. The process of claim 3 wherein the $C_7$ fluoroalcohol is $H(CF_2)_6CH_2OH$.

References Cited by the Examiner

UNITED STATES PATENTS

| 2,780,531 | 2/1957 | Lewis | 23—312 |
| 2,878,103 | 3/1959 | Robell | 23—190 |
| 3,063,806 | 11/1962 | Henrich | 23—190 |
| 3,133,870 | 5/1964 | Elliott | 23—190 X |

FOREIGN PATENTS 761,919  11/1956  Great Britain.

NORMAN YUDKOFF, *Primary Examiner.*

S. EMERY, *Assistant Examiner.*